United States Patent [19]
Motomura

[11] Patent Number: 5,895,983
[45] Date of Patent: Apr. 20, 1999

[54] FLASH CHARGING CIRCUIT

[75] Inventor: Katsumi Motomura, Saitama, Japan

[73] Assignee: Fuji Photo Film Co., Ltd., Kanagawa, Japan

[21] Appl. No.: 08/678,705

[22] Filed: Jul. 11, 1996

[30] Foreign Application Priority Data

Jul. 12, 1995 [JP] Japan .................. 7-176405

[51] Int. Cl.$^6$ .................................. H02M 3/337
[52] U.S. Cl. .................. 307/106; 307/107; 307/108; 307/109; 363/15; 363/56; 363/24
[58] Field of Search .................. 307/106, 107, 307/108, 109, 110; 363/15, 59, 134, 56, 24; 327/100, 103, 122; 315/200 R, 205–208, 219, 222, 241 P, 362, DIG. 7

[56] References Cited

U.S. PATENT DOCUMENTS

| | | | |
|---|---|---|---|
| 3,869,658 | 3/1975 | Hanke et al. | 323/25 |
| 4,307,440 | 12/1981 | Inoue et al. | 363/15 |
| 4,818,892 | 4/1989 | Oohashi et al. | 307/106 |
| 5,068,775 | 11/1991 | Borgatti et al. | 363/15 |
| 5,140,513 | 8/1992 | Yokoyama | 363/56 |
| 5,510,974 | 4/1996 | Gu et al. | 363/134 |

FOREIGN PATENT DOCUMENTS 7-29689  1/1995  Japan .

Primary Examiner—Ronald W. Leja
Assistant Examiner—Peter Ganjian
Attorney, Agent, or Firm—Young & Thompson

[57] ABSTRACT

A flash charging circuit has first and second transistors (TR1, TR2) which are connected to opposite terminals of a primary coil of a transformer, a battery is connected to a center tap provided in a middle portion of the primary coil, and first and second drive pulse signals (S1, S2) are applied to the first and second transistors to drive them alternately with each other, to induce an alternating secondary current in a secondary coil of the transformer. Each of the first and second drive pulse signals have a shorter pulse duration (Pd) than a pulse separation (Ps). The phases of the first and second drive pulse signals are determined such that both the first and second drive pulse signals take a low level for a time (Ta) before and after each drive pulse of the first and second drive pulse signals, so that both the first and second transistors are OFF immediately before either of them is turned ON.

4 Claims, 2 Drawing Sheets

FLASH CHARGING CIRCUIT

BACKGROUND OF THE INVENTION

1. Field of the Invention

The present invention relates to a flash charging circuit and a method of driving the flash charging circuit. More particularly, the present invention relates to a flash charging circuit wherein a main capacitor is charged effectively without any waste of power.

2. Description of the Related Art

To obtain a high voltage necessary for a discharge tube to flash, a main capacitor is charged up to the high voltage in a flash charging circuit, prior to each flashing. For quick charging of the main capacitor, a low voltage of a power source, such as a battery, is transformed to a higher voltage.

In a conventional flash charging circuit, a drive pulse signal is inputted at a regular interval in a single semiconductor switching element such as a transistor or a field effect transistor (FET), to turn the switching element ON and OFF, so as to intermittently apply a primary voltage through a primary coil of a transformer. In this type of flash charging circuit, a primary current flows through the primary coil while the semiconductor switching element is ON, and the primary current induces a secondary voltage in a secondary coil of the transformer. A secondary current caused by the secondary voltage is half-wave rectified, to be supplied to a main capacitor.

Because the secondary voltage is induced only while the semiconductor switching element is ON, the main capacitor is charged in an intermittent fashion. Accordingly, the total charging time necessary for charging the main capacitor up to the predetermined voltage is certainly long. To solve this problem, a flash charging circuit is disclosed in Japanese Laid-open Patent Application No. 7-29689.

In the flash charging circuit of this Japanese publication, a pair of semiconductor switching elements are connected to opposite terminals of a primary coil of a transformer, and a battery is connected to a center tap provided in a middle portion of the primary coil, such that a primary current flows from the center tap to the first terminal while one of the switching elements is driven, and that a primary current of an inverted phase flows from the center tap to the second terminal while the other switching element is driven.

First and second switching signals or drive pulse signals having inverted phase are applied to the switching elements to drive them alternately with each other. Thereby, the currents flow through the primary coil alternately in the opposite directions, so that an alternating secondary current is induced in a secondary coil of the transformer. This operation is called push-pull operation. The secondary current is full-wave rectified by a rectifier circuit, such as a diode bridge circuit, and is used to charge a main capacitor. Because one of the switching elements is ON while the other switching element is OFF, the secondary voltage is continuously induced, so that the main capacitor continues being charged. Thus, the improved flash charging circuit shortens the total charging time necessary for charging the main capacitor up to the predetermined voltage.

On the other hand, it is known in the art that a semiconductor switching element needs a certain response time from the application of a drive signal to the start of current conduction, as well as from the termination of the drive signal to the end of current flow. It is also known that a falling response time of a semiconductor from the end of driving to the actual end of current flow is generally longer than a rising response time of the same semiconductor from the start of driving to the actual current conduction, although both response times vary according to the type of the semiconductor.

Accordingly, in the latter flash charging circuit, since the switching signals have inverted phases, a drive pulse starts to be applied to the second switching element simultaneously with the trailing edge of the latest drive pulse that has been applied to the first switching element, or vise versa, so that the second switching element is turned ON before the first switching element is completely turned OFF, or vise versa.

Hereinafter, a time period from the start to the end of current conduction of each semiconductor will be referred to as ON-period, and a time period when the semiconductor does not conduct any current will be referred to as OFF-period. Then, it can be described that the ON-periods of the first and second switching elements overlap with each other in the conventional flash charging circuit using the inverted phase switching signals. While both of the switching elements are ON, the primary currents of the opposite directions concurrently flow through the primary coil of the transformer. As a result, magnetic fields of opposite directions are induced concurrently in the primary coil, so that they cancel each other. Consequently, the primary voltage is not induced in the secondary coil, so that the main capacitor is not charged. However, the power of the battery is still consumed at that time because the primary currents are flowing through the primary coil. That is a waste of electric power.

OBJECT OF THE INVENTION

In view of the foregoing, a prime object of the present invention is to provide a flash charging circuit having a push-pull transformer which prevents wasting of the battery power.

Another object of the present invention is to provide a method of driving a pair of semiconductor switching elements of such a flash charging circuit, which prevents wasting of the battery power.

SUMMARY OF THE INVENTION

To solve the above problem, in a flash charging circuit wherein first and second semiconductor switching elements are connected to opposite terminals of a primary coil of a transformer, a battery is connected to a center tap provided in a middle portion of the primary coil, and first and second drive pulse signals are applied to the first and second switching elements to drive them alternately with each other, to induce an alternating current in a secondary coil of the transformer, according to the present invention.

Each of the first and second drive pulse signals has a shorter pulse duration than a pulse separation, and the phases of the first and second drive pulse signals are determined such that both the first and second drive pulse signals take a low level for a time before and after each drive pulse of the first and second drive pulse signals, so that both the first and second semiconductor switching elements are OFF immediately before either of them is turned ON. In other words, a delay time is provided from a trailing edge of a drive pulse of one switching signal to a leading edge of a next drive pulse of the other switching signal, so that the ON-periods of both switching elements may not overlap with each other.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
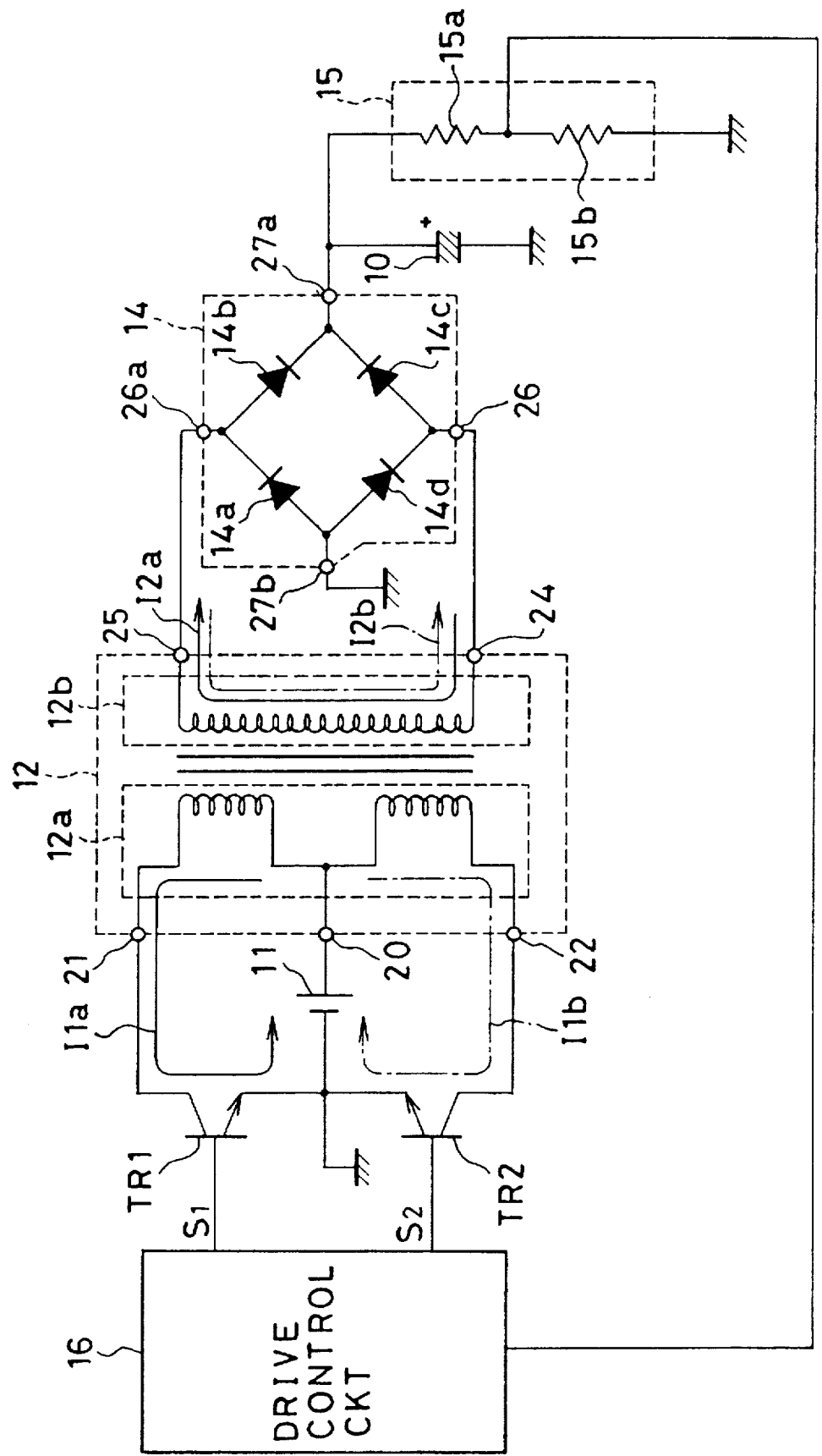
FIG. 1 shows a circuit diagram of a flash charging circuit according to an embodiment of the invention.

A flash charging circuit of FIG. 1 is constituted of a main capacitor 10, a battery 11 as a power source for charging the main capacitor 10, a transformer 12 for transforming a battery voltage to a higher voltage to be supplied to the main capacitor 10, first and second transistors TR1 and TR2 as semiconductor switching elements for applying the battery voltage to a primary coil 12a of the transformer 12 in alternating directions, a rectifier circuit 14 for full-wave rectification of alternating current from a secondary coil 12b of the transformer 12, a voltmeter circuit 15 for metering voltage charged in the main capacitor 10, and a drive control circuit 16. The main capacitor 10 is discharged through a not-shown flash discharge tube so as to cause the discharge tube to emit light. The battery 11 may serve as a main power source of a device into which the flash charging circuit is incorporated. For example in a camera, the battery 11 may be commonly used for driving a motor to wind up a photographic filmstrip. Also, the first and second transistors TR1 and TR2 may be replaced by a pair of field effect transistors (FET) or another type of semiconductor switching elements.

Figure 2:
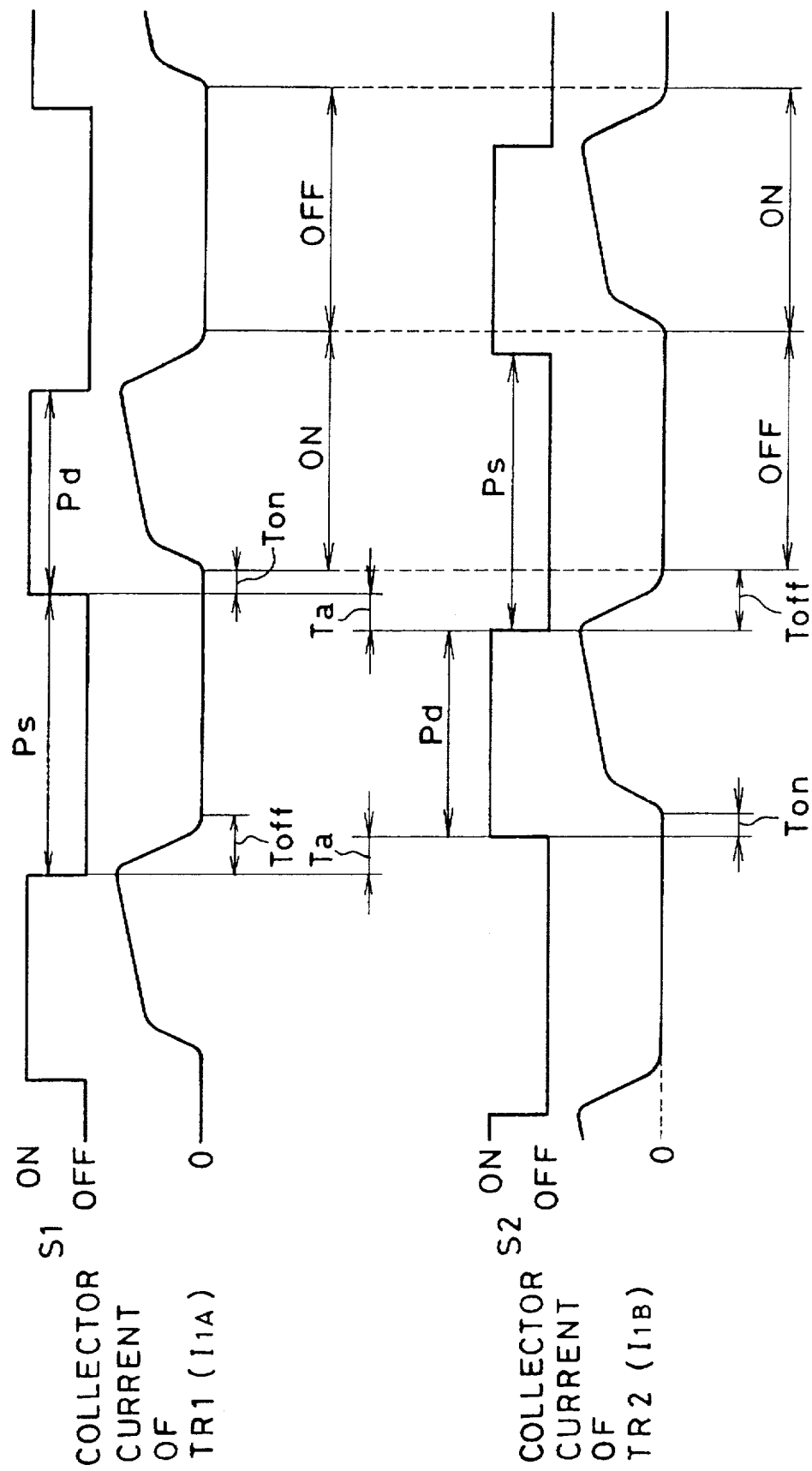
FIG. 2 shows timing charts illustrating the operation of the flash charging circuit.

The primary coil 12a and the secondary coil 12b of the transformer 12 are inductively connected to each other, and a center tap 20 is provided in a middle of the primary coil 12a. The center tap 20 is connected to a positive terminal of the battery 11 whose negative terminal is grounded. The first transistor TR1 is connected at its collector to a first terminal 21 of the primary coil 12a, and has its emitter grounded. The second transistor TR2 is connected at its collector to a second terminal 22 of the primary coil 12a, and has its emitter grounded. The first and second transistors TR1 and TR2 are driven responsive to switching signals S1 and S2, which are applied from the drive control circuit 16 to the bases of the transistors TR1 and TR2, respectively, as shown in FIG. 2. Hereinafter, a time period from the start to the end of collector current conduction of each transistor will be referred to as ON-period, and a time period when the transistor does not conduct any collector current will be referred to as OFF-period.

When the first transistor TR1 is turned ON, a battery voltage from the battery 11 is applied between the center tap 20 and the first terminal 21 of the primary coil 12a, so that a primary current I1a flows through the primary coil 12a in a direction from the center tap 20 to the first terminal 21. When the second transistor TR2 is turned ON, the battery voltage is applied between the center tap 20 and the second terminal 22 of the primary coil 12a, so that a primary current I1b flows through the primary coil 12a in an opposite direction from the center tap 20 to the second terminal 22.

The primary currents I1a and I1b induce an alternating secondary voltage in the secondary coil 12b. Responsive to the primary current I1a, a secondary current I2a flows through the secondary coil 12b in a direction from a first terminal 24 to a second terminal 25. And responsive to the primary current I1b, a secondary current I2b flows through the secondary coil 12b in the opposite direction. The secondary voltage is higher than the battery voltage, and its value or magnitude depends upon the ratio of the number of turns of the secondary coil 12b to the number of turns between the center tap 20 to the first terminal 21, as well as the ratio of the number of turns of the secondary coil 12b to the number of turns between the center tap 20 to the second terminal 22.

The rectifier circuit 14 is, for example, a bridge circuit consisting of four diode 14a to 14d,whose input terminals 26a and 26b are connected to the second and first terminals 25 and 24 respectively. An output terminal 27a of the rectifier circuit 14 is connected to a positive terminal of the main capacitor 10, while another output terminal 27b is grounded. A negative terminal of the main capacitor 10 is also grounded. Thus, the full waves of the alternating secondary currents I2a and I2b are rectified through the rectifier circuit 14, to charge the main capacitor 10.

The voltmeter circuit 15 consists of two serial resistances 15a and 15b, and is connected at one terminal to the positive terminal of the main capacitor 10. Another terminal of the voltmeter circuit 15 is grounded. The voltmeter circuit 15 is to detect a monitoring voltage to be monitored by the drive control circuit 16 by dividing the charge voltage of the main capacitor 10. As the monitoring voltage is proportional to the charge voltage of the main capacitor 10, the drive control circuit 16 stops outputting the switching signals S1 and S2 to terminate charging the main capacitor 10, when it determines with reference to the monitoring voltage that the charge voltage reaches a given level, e.g., 300 V.

The drive control circuit 16 outputs the switching signals S1 and S2 to the first and second transistors TR1 and TR2, respectively. Each of the switching signals S1 and S2 is a pulse signal having a constant pulse duration Pd and a constant pulse separation Ps, which are predetermined according to the properties of the transistors TR1 and TR2, the transformer 12 and other circuit conditions. When the switching signal S1 or S2 takes the high voltage level, i.e., when a drive pulse is applied to the base of the transistor TR1 or TR2, the transistor TR1 or TR2 is turned ON, i.e., the emitter-collector circuit thereof becomes conductive, respectively. Upon the switching signal S1 or S2 taking the low voltage level, e.g. 0V, the transistor TR1 or TR2 is turned OFF, respectively.

The drive control circuit 16 starts outputting a drive pulse of the switching signal S2 with a delay time Ta from a trailing edge of a preceding drive pulse of the switching signal S1. Also, a drive pulse of the switching signal S1 starts to be outputted with the delay time Ta from a trailing edge of a preceding drive pulse of the switching signal S2.

The delay time Ta is provided for the reasons as set forth below.

It is known in the art that a semiconductor switching element needs a certain response time from the application of a drive pulse to the start of current flow, as well as from the termination of the drive pulse to the end of current flow. For instance, the transistor TR1 or TR2 needs a response time Ton from the application of the drive pulse to the base till the collector current begins to flow, i.e., till the start of ON-period of the transistor S1 or S2. The transistor TR1 or TR2 also needs a response time Toff from the termination or the trailing edge of the drive pulse till the collector current decreases to zero, till the start of OFF-period of the transistor S1 or S2. It is also known that the response times Ton and Toff both vary according to the type of the semiconductor, but the response time Toff is generally longer than the response time Ton in the same semiconductor.

Accordingly, if the switching signals S1 and S2 had inverted phases to each other, a drive pulse would begin to be applied to the second transistor TR2 at the trailing edge of the preceding drive pulse applied to the first transistor TR1 , or vise versa. As described above, the first transistor S1 reaches the OFF-period after the response time Toff from the trailing edge of the drive pulse of the switching signal S1, whereas the second transistor S2 reaches the ON-period after the response time Ton from the leading edge of the drive pulse of the switching signal S2. Because the response time Ton is shorter than the response time Toff, if the leading edge of the drive pulse of the switching signal S2 were concurrent with the trailing edge of the drive pulse of the switching signal S1, the second transistor TR2 would reach the ON-period before the first transistor TR1 reaches the OFF-period.

That is, the ON-periods of the first and second transistors TR1 and TR2 would overlap with each other. Then, the primary currents I1a and I1b of the opposite directions would flow through the primary coil 12a of the transformer 12. As a result, magnetic fields of opposite directions would be induced concurrently in the primary coil 12a so that they cancel each other.

Consequently, scarcely any primary voltage would be induced in the secondary coil 12b, and the secondary currents I2a and I2b would not flow the secondary coil 12b, so that the main capacitor 10 would not be charged, although the power of the battery 11 would be consumed at that time since the collector currents of the transistors TR1 and TR2, i.e., the primary currents I1a and I1b are flowing. That is a waste of electric power.

In order to solve the above problem, the pulse duration Pd is set shorter than the pulse separation Ps in each of the first and second switching signals S1 and S2, such that the OFF-periods of both transistors TR1 and TR2 overlap each other at least for a slight moment before and after every ON-period of the transistors TR1 and TR2. For this reason, the delay time Ta is provided between a trailing edge of a drive pulse of one of the switching signals S1 and S2 and a leading edge of the next drive pulse of the other switching signal S2 or S1.

The delay time Ta is determined based on the response times Ton and Toff such that the OFF-periods of both transistors TR1 and TR2 overlap each other for a slight moment. Specifically, the delay time Ta is determined to be equal to or slightly greater than a difference between the longer response time Toff and the shorter response time Ton. Thereby, one of the transistors TR1 and TR2 gets into the ON-period simultaneously with or immediately after the other transistor TR1 or TR2 getting into the OFF-period. By minimizing the overlap time of the OFF-periods of both transistors TR1 and TR2, intermittence of charging of the main capacitor 10 is minimized, so that the total charging time necessary for charging the main capacitor 10 to the predetermined voltage may not be elongated. It is to be noted that the response times Toff and Ton are exaggerated for clarity in the drawings.

It is to be noted that the first and second transistors TR1 and TR2 of the embodiment shown in the drawings are assumed to have the same response characteristics, i.e. the same response times Toff and Ton. Therefore, it is possible to insert the same delay time Ta in between a drive pulse of one switching signal S1 or S2 and a following drive pulse of the other switching signal S2 or S1. However, if those semiconductors which have different response characteristics from each other are used as the switching elements, the delay time Ta should be changed correspondingly.

Since the response times Ton and Toff vary according to the type of the semiconductor switching element, the delay time Ta also varies according to the type of the switching elements, e.g. the type of the first and second transistors TR1 and TR2. However, the delay time Ta is usually 0.5 µs to 5 µs as for transistors.

The above-described flash charging circuit operates as follows.

The drive control circuit 16 receives a command to start charging, for example, when a not-shown charge start button is depressed. In response to the charge start command, the drive control circuit 16 outputs the first and second switching signals S1 and S2 to the bases of the first and second transistors TR1 and TR2, respectively.

When a drive pulse is applied to the base of the first transistor TRI, the base current begins to flow, and in the response time Ton from the leading edge of the drive pulse, the first transistor TR1 enters the ON-period, starting to conduct the collector current. Thereafter, the first transistor TR1 operates in its saturated condition. During the ON-period of the first transistor TR1, the battery voltage of the battery 11 is applied between the center tap 20 and the first terminal 21 of the primary coil 12a of the transformer 12, so that the primary current I1a flows through the primary coil 12a from the center tap 20 to the first terminal 21. As a result, the secondary current I2a flows through the secondary coil 12b from the first terminal 24 to the second terminal 25. The secondary current I2a is supplied to the main capacitor 10 after being rectified through the diodes 14a and 14d, to charge the main capacitor 10.

When a predetermined time has elapsed, the drive control circuit 16 sets the first switching signal S1 to zero volts, and thus terminates outputting the drive pulse to the first transistor TR1, so that the base voltage of the first transistor TR1 is set to zero. The collector current of the first transistor TR1 does not decrease immediately after the base voltage is set to zero, but starts decreasing in a given time (a storage time) therefrom, and the first transistor TR1 is completely turned OFF when the response time Toff has elapsed after its base voltage is set to zero. In the OFF-period, the first transistor TR1 does not conduct any collector current, i.e. the primary current I1a.

On the other hand, the drive control circuit 16 starts outputting a drive pulse of the second switching signal S2 to the second transistor TR2 when the delay time Ta has elapsed after the termination of the drive pulse of the first switching signal S1. When the drive pulse is applied to the base of the second transistor TR2, the base current begins to flow, and in the response time Ton from the leading edge of the drive pulse, the second transistor TR2 starts conducting the collector current. Thereafter, the second transistor TR2 operates in its saturated condition.

During the ON-period of the second transistor TR2, the battery voltage of the battery 21 is applied between the center tap 20 and the second terminal 22 of the primary coil 12a of the transformer 12, so that the primary current I1b flows through the primary coil 12a from the center tap 20 to the second terminal 22. As a result, the secondary current I2b flows through the secondary coil 12b from the second terminal 25 to the first terminal 24, that is reverse to the secondary current I2a that flows during the ON-period of the first transistor TR1. The secondary current I2b is supplied to the main capacitor 10 after being rectified through the diodes 14b and 14c, to charge the main capacitor 10.

Because the drive pulse of the second switching signal S2 applied to the second transistor TR2 begins when the delay time Ta has elapsed after the termination switching signal S1, the second transistor TR2 enters the ON-period after the first transistor TR1 enters the OFF-period. That is, the second transistor TR2 reaches the ON-period after both of the transistors TR1 and TR2 are turned OFF for a slight moment. Accordingly, the collector current of the second transistor TR2, i.e. the primary current I1b, does not flow until the collector current of the first transistor TR1, i.e. the primary current I1a of the inverted phase, is reduced to zero. Therefore, the secondary current I2b begins to flow after the secondary current I2a of the inverted phase is completely extinguished, so that there is no fear of wasting the power of the battery 11.

When a predetermined time has elapsed, the drive control circuit 16 sets the second switching signal S2 to the low level (0 volt), and thus terminates outputting the drive pulse to the second transistor TR2, so that the base voltage of the second transistor TR2 is set to zero. The collector current of the second transistor TR2 starts decreasing in the given time from the termination of the drive pulse, so that the second transistor TR2 reaches the OFF-period when the response time Toff has elapsed since the base voltage is set to zero. In the OFF-period, the second transistor TR2 does not conduct the collector current, i.e. the primary current I1b.

The drive pulse of the first switching signal S1 is applied to the first transistor TR1 when the delay time Ta has elapsed since the termination of applying the drive pulse of the second switching signal S2. Therefore, the first transistor TR1 gets into the ON-period after the second transistor TR2 gets into the OFF-period. That is, the first transistor TR1 reaches the ON-period after both of the transistors TR1 and TR2 are OFF for a slight moment. Accordingly, the collector current of the first transistor TR1, i.e. the primary current I1a, does not flow until the collector current of the second transistor TR2, i.e. the primary current I1b of the inverted phase, is completely terminated. Therefore, the secondary current I2a begins to flow after the secondary current I2b of the inverted phase is completely extinguished, so that there is no fear of wasting the power of the battery 11.

The drive control circuit 16 repeats the same operation as above until it is determined based on the monitoring voltage detected through the voltmeter 15 that the main capacitor 10 is charged to the predetermined voltage.

Although the present invention has been described in detail with respect to the preferred embodiment shown in the drawings, the present invention should not be limited to the above embodiment but, on the contrary, various modifications may be possible to those skilled in the art without departing from the scope of appended claims.

What is claimed is:

1. A flash charging circuit comprising:

a transformer for transforming a power source voltage to a higher voltage;

a power source connected to a center tap of a primary coil to supply the power source voltage to the primary coil;

a first semiconductor switching element connected between a first terminal of the primary coil and the power source;

a second semiconductor switching element connected between a second terminal of the primary coil and the power source;

a rectifier connected to a secondary coil of the transformer, for full-wave rectification of an alternating current which flows through the secondary coil while the first and second semiconductor switching elements are turned ON and OFF alternately with each other; and a drive control device for outputting first and second switching signals to the first and second semiconductor switching elements, respectively, each of the first and second switching signals being a drive pulse signal having a shorter pulse duration than a pulse separation, such that both the first and second switching signals reach a low level before and after every drive pulse of the first and second switching signals so that both the first and second switching elements are OFF for a period immediately before either of the first and second switching elements are turned ON;

wherein a delay time is provided between a trailing edge of a first drive pulse of one of the first and second switching signals and a leading edge of a next drive pulse of another of the first and second switching signals, the delay time being determined based on a first response time necessary from the trailing edge of the first drive pulse till one of the first and second switching elements, to which the first drive pulse has been applied, is turned OFF, and a second response time necessary from the leading edge of the next drive pulse till the other of the first and second switching elements is turned ON.

2. A flash charging circuit according to claim 1, wherein the delay time is determined to be equal to or slightly more than a difference between the response times.

3. A method of driving a flash charging circuit comprising a transformer for transforming a power source voltage to a higher voltage, a power source connected to a center tap of a primary coil to supply the power source voltage to the primary coil, a first semiconductor switching element connected between a first terminal of the primary coil and the power source, a second semiconductor switching element connected between a second terminal of the primary coil and the power source, a rectifier connected to a secondary coil of the transformer, for full-wave rectification of an alternating current which flows through the secondary coil while the first and second semiconductor switching elements are turned ON and OFF alternately with each other, the method comprising the steps of:

outputting a first switching signal to the first semiconductor switching element, the first switching signal being a drive pulse signal having a shorter pulse duration than a pulse separation;

outputting a second switching signal to the second semiconductor switching element, the second switching signal being a drive pulse signal having a shorter pulse duration than a pulse separation, the second switching signal having such a phase relative to the first switching signal that both the first and second switching signals reach a lower level before and after every drive pulse of the first and second switching signals, so that both the first and second switching elements are OFF for a period immediately before either of the first and second switching elements are turned ON;

wherein a delay time is provided between a trailing edge of a first drive pulse of one of the first and second switching signals and a leading edge of a next drive pulse of another of the first and second switching signals, the delay time being determined based on a first response time necessary from the trailing edge of the first drive pulse till one of the first and second switching elements, to which the first drive pulse has been applied, is turned OFF, and a second response time necessary from the leading edge of the next drive pulse till the other of the first and second switching elements is turned ON.

4. A method of driving a flash charging circuit according to claim 3, wherein the delay time is determined to be equal to or slightly more than a difference between the response times.

* * * * *